(12) United States Patent
Singh (10) Patent No.: US 12,287,855 B2
(45) Date of Patent: Apr. 29, 2025

(54) TOKENIZATION FOR CASCADING USER UPDATES

(71) Applicant: PayPal, Inc., San Jose, CA (US)

(72) Inventor: Narendra Singh, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 329 days.

(21) Appl. No.: 17/548,230

(22) Filed: Dec. 10, 2021

(65) Prior Publication Data

US 2023/0185888 A1 Jun. 15, 2023

(51) Int. Cl.
*G06F 21/31* (2013.01)

(52) U.S. Cl.
CPC .................................. *G06F 21/31* (2013.01)

(58) Field of Classification Search
CPC ....................................................... G06F 21/31
See application file for complete search history.

(56) References Cited

U.S. PATENT DOCUMENTS

| | | | | |
|---|---|---|---|---|
| 6,173,272 B1* | 1/2001 | Thomas | ............. | G06Q 20/385 |
| | | | | 705/42 |
| 8,271,510 B2* | 9/2012 | Sivakkolundhu | ....... | G06F 16/29 |
| | | | | 707/758 |
| 8,407,110 B1* | 3/2013 | Joseph | ............. | G06Q 30/0633 |
| | | | | 705/26.81 |
| 8,526,743 B1* | 9/2013 | Campbell | ............. | H04N 23/80 |
| | | | | 382/218 |
| 8,800,027 B1* | 8/2014 | Ackerman | ............ | H04W 12/06 |
| | | | | 380/258 |
| 10,853,791 B1* | 12/2020 | Ellis | ............. | G06Q 20/3676 |
| 2006/0041573 A1* | 2/2006 | Miller | ............. | G06F 16/29 |
| 2008/0294536 A1* | 11/2008 | Taylor | ............. | G06Q 10/087 |
| | | | | 705/28 |
| 2008/0301009 A1* | 12/2008 | Plaster | ............. | G06Q 10/087 |
| | | | | 705/28 |
| 2009/0099954 A1* | 4/2009 | Kilby | ............. | G06Q 50/08 |
| | | | | 705/37 |
| 2011/0053559 A1* | 3/2011 | Klein | ............. | G07C 13/00 |
| | | | | 235/386 |
| 2012/0203663 A1* | 8/2012 | Sinclair | ............. | G06Q 30/06 |
| | | | | 713/168 |
| 2013/0246199 A1* | 9/2013 | Carlson | ............. | G06Q 20/405 |
| | | | | 705/16 |

(Continued)

*Primary Examiner* — Techane Gergiso
(74) *Attorney, Agent, or Firm* — HAYNES AND BOONE, LLP (57) ABSTRACT

Systems and methods for using tokenization are provided. In an embodiment, a first computer system receives a notification from a second computer system that user information has changed for a first user account serviced by the second computer system. The notification includes a token corresponding to a second user account serviced by the first computer system. The first user account and the second user account belong to a user. The first computer system searches for the second user account, based on the token, in a database associated with the first computer system. The first computer system updates the second user account to include the user information change and publishes the user information change to other computer systems that subscribe to updates from the first computer system. The published user information change causes the other computer systems to update corresponding user accounts to include the published user information change.

19 Claims, 5 Drawing Sheets

(56) References Cited

U.S. PATENT DOCUMENTS

| | | | |
|---|---|---|---|
| 2014/0222339 A1* | 8/2014 | Abhyanker | G01C 21/3837 |
| | | | 726/28 |
| 2014/0237062 A1* | 8/2014 | Abhyanker | H04W 76/50 |
| | | | 709/206 |
| 2014/0344153 A1* | 11/2014 | Raj | G06Q 20/385 |
| | | | 705/44 |
| 2015/0032627 A1* | 1/2015 | Dill | G06Q 20/385 |
| | | | 705/44 |
| 2015/0112870 A1* | 4/2015 | Nagasundaram | G06Q 20/3821 |
| | | | 705/67 |
| 2015/0312038 A1* | 10/2015 | Palanisamy | G06Q 20/385 |
| | | | 713/155 |
| 2017/0068939 A1* | 3/2017 | Groarke | G06Q 20/20 |
| 2017/0187703 A1* | 6/2017 | Enrique Salpico | H04L 63/162 |
| 2019/0050438 A1* | 2/2019 | Fast | G06F 16/23 |
| 2019/0303560 A1* | 10/2019 | Altenhofen | G06F 21/60 |
| 2021/0133748 A1* | 5/2021 | Li | G06Q 20/085 |
| 2021/0142284 A1* | 5/2021 | Kaczmarek | G06Q 20/3829 |
| 2021/0329076 A1* | 10/2021 | DeLorenzo | G06F 21/6218 |
| 2021/0374722 A1* | 12/2021 | Gower | G06Q 20/3221 |
| 2022/0309516 A1* | 9/2022 | Rhoads | G06N 20/00 |
| 2023/0161976 A1* | 5/2023 | Sazonova | G06N 20/20 |
| | | | 704/2 |

* cited by examiner

TOKENIZATION FOR CASCADING USER UPDATES

TECHNICAL FIELD

The present disclosure generally relates to data security and more particularly to using tokenization to cascade user account updates across several different user accounts corresponding to connected computer systems, according to various embodiments.

BACKGROUND

In data security, tokenization is the process of substituting sensitive data with a non-sensitive equivalent, referred to as a token, that has no extrinsic or exploitable meaning or value. The token is a reference (e.g., identifier) that maps back to the sensitive data through a tokenization system. Replacing sensitive data with tokens in systems is intended to minimize exposure of sensitive data to applications, stores, people, and processes that would otherwise handle the sensitive data, thereby reducing the risk of compromise or accidental exposure and unauthorized access to the sensitive data.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Users generally have several user accounts that are serviced by different corresponding service providers. Each user account may have user information stored thereto. If the user information for a user changes, the user is generally required to manually update each user account to reflect the change to the user information. This process may be tedious for a user as each user account will need to be manually updated each time there is a change to the user information. For example, updating each user account may require the user to go to several different websites or device applications and adjust the user information for each user account. For example, consider when a user changes a residential address, billing address, and/or mailing address for one of his/her user accounts, the user will also need to manually update each of the other user accounts that he/she has in order to reflect the address change across all user accounts.

The present disclosure provides central tokenization systems and related methods that improve upon data management technology by allowing a single update for a user account to be cascaded by a central tokenization system to other user accounts associated with other service provider computer systems that are connected to the central tokenization system. The central tokenization systems and methods may further provide the service provider computer systems with capabilities for fetching or validating user information (e.g., an address, contact information, etc.) using a token. For example, in a transaction payment flow, a merchant may be provided with a token by the user (e.g., a consumer). The merchant can use the token to query the central tokenization system to retrieve the needed user information to continue the transaction payment flow. As another example, the token may be used as a form of validation for the merchant, where the merchant can provide the central tokenization system with a token and user information and request that the central tokenization system validate whether the user information belongs to the token. Said validation may allow the merchant to complete a validation operation in the transaction payment flow for the merchant. In further embodiments, the central tokenization systems and related methods allow for an on-the-go address that is based on real-time geocoordinates to be accepted in merchant transaction flows rather than a conventional address without requiring a merchant to adjust its user interfaces and/or back-end processing to accept such on-the-go addresses.

In one exemplary embodiment of the present disclosure, a user may make a change to his/her user information in a first user account that is serviced by a first service provider. A central tokenization system, which is controlled by a second service provider, may receive a notification from a connected computer system, which is controlled by the first service provider. The notification may indicate that user information has changed for the first user account. The notification may include a token linked to the first user account. The token may also be linked to a second user account that is serviced by the second service provider. Both the first and the second user accounts may belong to the user who has made the change to the user information on the first account.

The central tokenization system may search for the second user account using the token for a lookup in a database associated with the central tokenization system. Once the central tokenization system has identified the second user account, the central tokenization system may update the second user account to reflect the change to the user information.

The central tokenization system may then publish the user information change to one or more other computer systems that subscribe to updates from the central tokenization system. The one or more other computer systems may correspond to other various service providers that each service other user accounts that belong to the user. The published user information change may cause the one or more other computer systems to update respective user accounts to reflect the published user information change.

Thus, by using a central tokenization system that is connected to various other computer systems for different service providers, a single update to a user account at one of the service provider platforms may be provided to the central tokenization system and cascaded to other connected computer systems, such that a user only has to make a change to one user account in order for each of his/her connected user accounts to also be updated to reflect the change. For example, the disclosed central tokenization technology may allow for a user to change an address (e.g., a mailing address, billing address, residential address, etc.) for a user account and have the changed address be cascaded to a plurality of other user accounts belonging to the user for various service provider platforms.

Figure 1A:
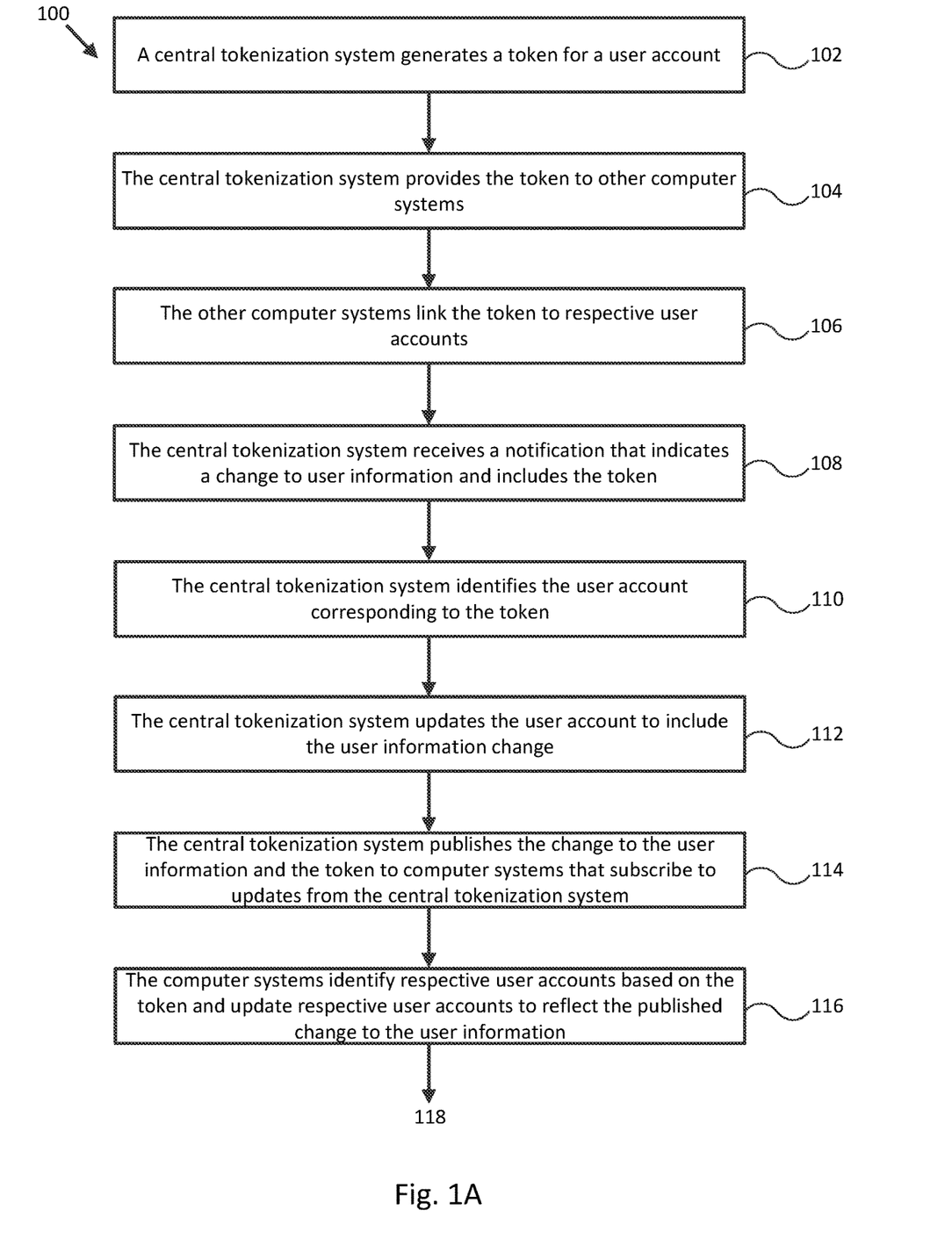
FIGS. 1A-1B illustrates a flow diagram of a process for using tokenization in accordance with various embodiments of the present disclosure.
Figure 1B:
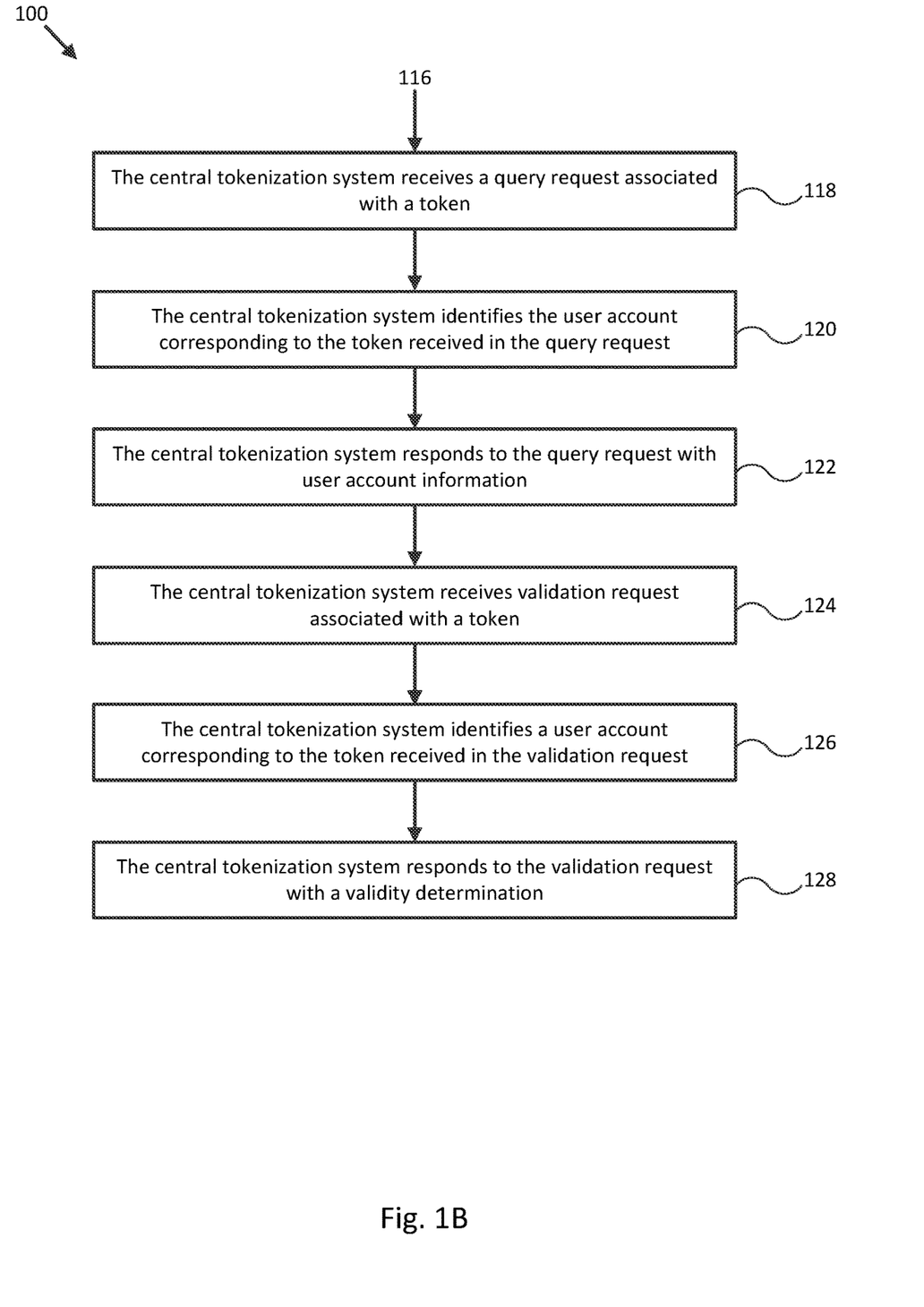

Referring now to FIGS. 1A and 1B, illustrated is a flow diagram of a process 100 for using central tokenization in accordance with embodiments of the present disclosure. The blocks of process 100 are described herein as occurring in serial, or linearly (e.g., one after another). However, multiple blocks of process 100 may occur in parallel. In addition, the blocks of process 100 need not be performed in the order shown and/or one or more of the blocks of process 100 need not be performed. For explanatory purposes, process 100 is primarily described herein with reference to system 200 of FIG. 2.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

In some embodiments, various operations of the process 100 may be performed by a computer system having at least a non-transitory memory (e.g., a machine-readable medium) and one or more hardware processors configured to read instructions from the non-transitory memory to cause the system to perform the process 100. For example, the computer system may include one or more computer systems 400 of FIG. 4.

Figure 2:
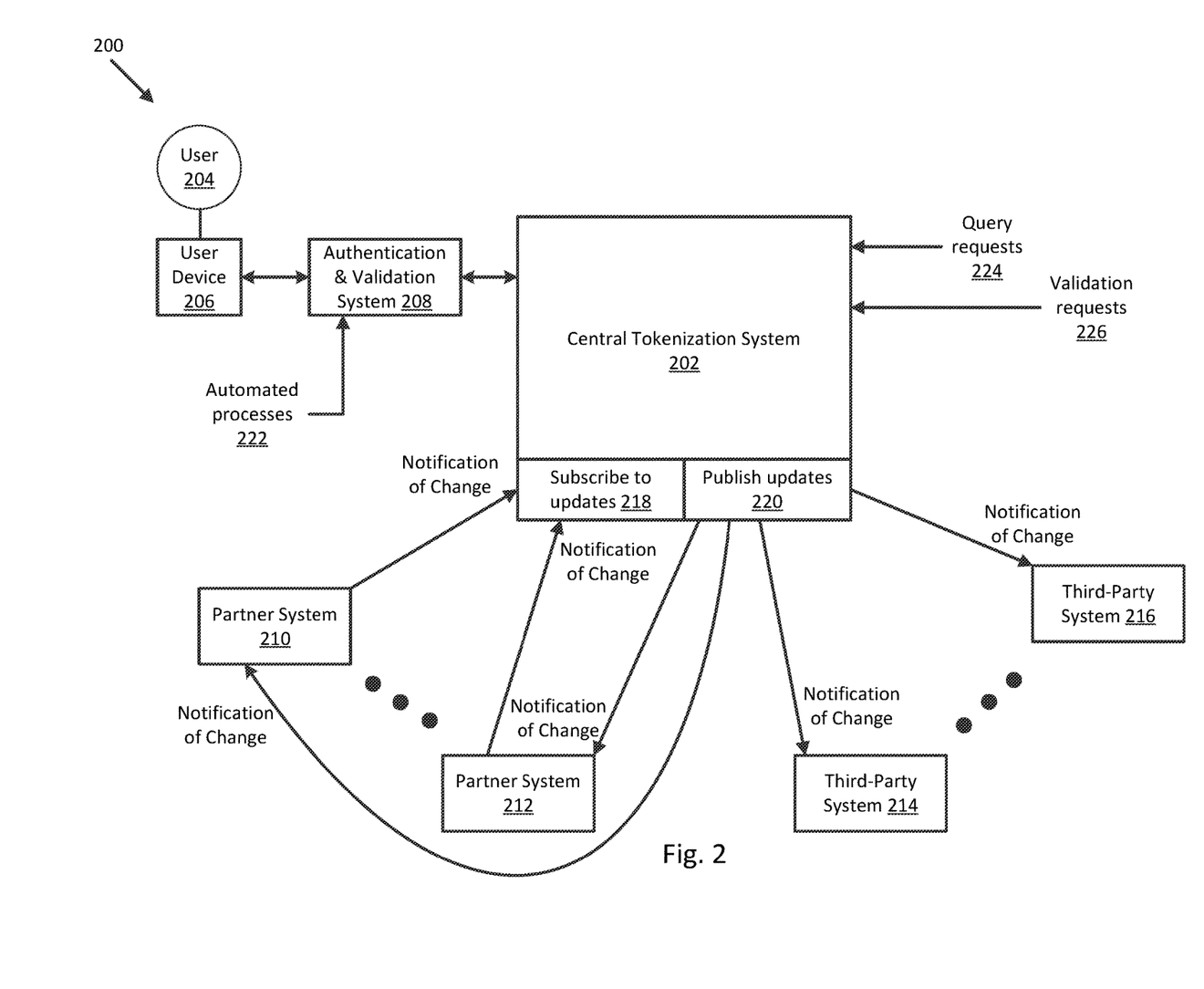
FIG. 2 illustrates an example implementation of a central tokenization system in accordance with one or more embodiments of the present disclosure.

At block 102 of process 100, and in reference to FIG. 2, a token for a main user account may be generated by, e.g., a central tokenization system 202 (e.g., a computer system), where the token is associated with the central tokenization system 202.

As an illustration, a user 204 may set up a main user account with the central tokenization system 202 and link one or more of the user's other user accounts serviced by various service providers to the central tokenization system 202, so that the main user account and each of the linked accounts can be updated when the user 204 makes a change to one of the user accounts, rather than requiring the user 204 to make the desired change to each account one-by-one on the various platforms for the service providers.

To register or log in to the main user account for the central tokenization system 202, the user 204 may use a user device 206 to access a website or application corresponding to a service provider that controls the central tokenization system 202. In some embodiments, an authentication and validation system 208 may be used to establish an authentication profile for the user 204 when registering the main user account for the user 204 such that the user 204 may be authenticated when the user 204 logs into the main user account.

In some embodiments, the token that the central tokenization system 202 generates for the main user account may be a string of randomly generated alphanumeric characters and/or symbols. The sequence of alphanumeric characters and/or symbols may be randomly generated such that they cannot be reasonably predicted better than by random chance and have no extrinsic or exploitable meaning or value outside of use by the central tokenization system 202. Using the token as an account identifier may therefore make it more difficult for attackers to gain access to sensitive data for the user 204 outside the central tokenization system 202.

At block 104 of process 100, the central tokenization system 202 may provide the token to other computer systems. As shown in FIG. 2, the other computer systems may include partner systems 210-212 and third-party systems 214-216. The partner systems 210-212 and third-party systems 214-216 may be connected, via a network, to the central tokenization system 202 as a result of a registration process whereby service providers that own/control the partner systems 210-212 and third-party systems 214-216 agree to connect to the central tokenization system 202 so that user accounts belonging to the user 204 and serviced by the various service providers may be updated in a cascading or parallel fashion as a result of a change to a single account registered with the central tokenization system 202. Connecting to the central tokenization system 202 may provide additional capabilities to the partner systems 210-212 and third-party systems 214-216, such as being able to query and validate user information using a token, as discussed later in the disclosure.

At block 106, the partner systems 210-212 and third-party systems 214-216 may link the token received from the central tokenization system 202 to their respective user accounts. For example, the partner systems 210-212 and third-party systems 214-216 may data map the token to respective user accounts in associated user account databases. By linking the token received from the central tokenization system 202 to a respective user account, a partner system or third-party system may be able to receive a notification of an update to user information from the central tokenization system 202 along with the token, and then perform a reverse lookup to identify which of its own serviced user accounts to update.

In some embodiments, the central tokenization system 202 may use an API, or other communication interface, for the partner systems 210-212 and third-party systems 214-216 to send user account identifying information to said systems for respective serviced user accounts (e.g., user account IDs, credentials, etc.), so that the partner systems 210-212 and third-party systems 214-216 may know which respective user account to map to the token received at block 106. In some embodiments, the central tokenization system 202 may provide such information to the partner systems 202-212 and third-party systems 214-216 in response to receiving a query from the partner systems 202-212 and third-party systems 214-216 associated with the token.

Once operations at blocks 102-106 have been completed, the system 200 may be configured to cascade or propagate user account updates according to various embodiments discussed below.

For example, at block 108 of process 100, the central tokenization system 202 may receive a notification that indicates a change to user information for a user account and includes a token associated with the user account. In some embodiments, the change to the user information may be a change of address (e.g., billing address, mailing address, residential address, etc.), a change of contact information (e.g., telephone number, email address, etc.), a change of name, a change to banking/financial information, or a change to other types of user information that may be ubiquitous between the user's various user accounts with different service providers. In some embodiments, an address may be a physical real-world address or a virtual address (e.g., an address owned by a virtual address service provider where mail sent to that address is received by the virtual address service provider and made available for online viewing by the user 204, such as through a cloud-based service).

In one case, the notification that indicates the change to the user information and includes the token may be received from one of the partner systems 210-212. For example, as shown in FIG. 2, the central tokenization system 202 may subscribe to updates 218 from the partner systems 210 and 212. By subscribing to updates 218 from the partner systems 210 and 212, the central tokenization system 202 may periodically poll the partner systems 210 and 212 for user account updates and/or receive push notifications from the partner systems 210 and 212 indicating a user account update. A user account update from a partner system may mean that the user 204 has made a change to his/her user account serviced by the partner system.

In some embodiments, the partner systems 210-212 may have automated processes 222 that allow the partner systems 210-212 to use the authentication and validation system 208 to process a change to user information for a user account, which can be circulated through the central tokenization system 202 to a main user account associated with the central tokenization system 202 and other user accounts for the user 204 that are serviced by other computer systems connected to the central tokenization system 202. For example, the automated processes 222 may provide a user interface flow for the user device 206 that authenticates the user 204 based on credentials associated with the main user account for the central tokenization system 202 and validates that the change to the user information is acceptable according to predefined formatting rules for the user information (e.g., a change to an address is in an acceptable format, according to predefined format rules, that will allow the change to be cascaded to the other linked user accounts).

In some embodiments, the automated processes 222 may allow for batch/bulk requests from partner systems 210-212 to onboard information (e.g., new user addresses), such as in a tokenization request. In this regard, the automated processes 222 may substitute for the actions of individual users. Automated processes 222 may be implemented in various configurations to allow for interactions between the central tokenization system 202 and the partner systems 210-212. For example, OAuth may be used for conveying authorization decisions across a network of web-enabled applications and APIs controlled by the various systems.

In other cases, the change to the user information and the token may be received from the user device 206. For example, the user 204 may log in to the main user account associated with the central tokenization system 202 using the user device 206. In one embodiment, the user 204 may provide login credentials to the authentication and validation system 208 to be authenticated for access to the main user account associated with the central tokenization system 202. The user 204 may then make a change to the user information in the main user account through a setting configuration user interface for the main user account. The change to the user information along with the token linked to the main user account may then be provided to the central tokenization system 202 from the user device 206. In some embodiments, the central tokenization system 202 may additionally request, from the user device, authentication data and location data to validate that the user device is authorized to update the main user account. For example, the central tokenization system 202 (or associated systems) may compare the authentication data to authentication data on record for the main user account. If there is a match of authentication data, the user may be authenticated and authorized to change the user information in the main user account. In some cases, the retrieved location data may be geolocation data that the central tokenization system 202 (or associated systems) may use to compare to the change in user information to validate that the user is actually located at an address being used in the change to the user information (e.g., if there is a mailing address change, the geolocation obtained from the user device 206 should align with mailing address). In this regard, the main user account may be secure as a bad actor who fraudulently obtains access to the main user account will not be able to change the user address for the main user account unless the bad actor also has possession of the user's user device 206.

In some cases, the change to the user information may be automatically provided by the user device 206. For example, the user device 206 may provide the central tokenization system 202 with a current location (either geocoordinates or a physical address approximation) of the user 206 to be used as an address for the main user account (e.g., for mailing, billing, or residence purposes). In some embodiments, the authentication and validation system 208 may validate that the changed user information is in an acceptable format based on predefined format rules for the user information. For example, in the case of a physical address change for the main user account, the predefined format rules for the user information may be specific to a region encompassing the new physical address. As an illustration, when the address is in the United States, the format for the address may include a street number, post office box number, secondary descriptor (e.g., suite, apartment number, floor, etc.), city, state, and/or zip code. However, other jurisdictions may require other information in an address such as a province.

In further embodiments, where the change to the user information is an address change, a device-generated address (e.g., current geocoordinates provided by the user device 206) may be sent to the authentication and validation system 208 along with the user's input of the physical address change. The authentication and validation system 208 may validate that the device-generated address matches the physical address (e.g., the geocoordinates align with the physical address inputted by the user). If the device-generated address matches the physical address, the change to the address may be allowed to circulate through the central tokenization system 202 to other user accounts. Thus, in this embodiment, user account security is improved as a bad actor will not be able to make address changes to all of the user's user accounts, unless the bad actor is in possession of the user device 206 and is located at the changed address with the user device 206.

In various embodiments, the authentication and validation system 208 may also be configured to request that the user 204 solve security challenges in order to authenticate the user 204 prior to allowing the user 204 to submit a change to user information for circulation to other linked user accounts. For example, the authentication and validation system 208 may send a security challenge to the user device 206 to be presented in a user interface in the user device 206. The security challenge may be an authentication input such as a password, biometric authentication input, a one-time-password input sent through text message or email, PIN, and/or security questions specific to the main user account. Upon receiving a correct response from the user 204, the authentication and validation system 208 may authenticate the user 204 and/or the user device 206 to proceed with the change to the user information using the central tokenization system 202.

At block 110, the central tokenization system 202 may identify the user account that corresponds to the token received at block 108. For example, the central tokenization system 202 may identify the user account by searching a user account database associated with the central tokenization system 202 for the user account linked to the token. For example, the central tokenization system 202 may perform a reverse lookup, using the token, in the user account database associated with the central tokenization system 202. The identified user account may be the main user account that the user 204 established when registering with the central tokenization system 202.

At block 112, the central tokenization system 202 may update the user account identified at block 110 to reflect the change to the user information received at block 108. For example, the central tokenization system 202 may update the main account in the user account database associated with the central tokenization system 202.

At block 114, the central tokenization system 202 may publish a notification of the change in the user information, as a user account update, to computer systems that subscribe to updates from the central tokenization system 202. For example, the partner systems 210-212 and third-party systems 214-216 may listen for and receive published updates 220 from the central tokenization system 202. A published update 220 may include information related to account updates for the user 204 that have been made in a user account that belongs to the user 204 and has been linked to the central tokenization system 202. The published update 220 may further include the token so that listening/receiving computer systems may identify their respective linked user accounts and update their respective user accounts to reflect the change in the published update 220, as further discussed below.

At block 116, one or more of the connected computer systems (e.g., one or more of the partner systems 210-212 and/or the third-party systems 214-216) may receive the published update 220 from the central tokenization system 202. The one or more connected computer systems may search for and identify their respective user accounts linked to the token. For example, the one or more connected computer systems may perform a reverse lookup based on the token contained in the published update 220 to identify their respective user accounts linked to the token. The one or more connected computer systems may then update their respective user accounts to reflect the change to the user information received in the published update 220.

In some embodiments, the one or more connected computer systems may choose to ignore published updates 220 that include tokens that do not correspond to a user account for the one or more connected computer systems. For example, if a computer system determines through a lookup search, using the token, that it does not have a record of a user account linked to said token, the computer system may ignore the published update 220. In other embodiments, the one or more connected computer systems may be selective about which items of information in the published updates 220 to include as changes in their respective user accounts. For example, where the one or more connected computer systems do not have a need for certain items of information in the published update 220, the one or more connected computer systems may determine not to make certain changes in respective user accounts to reflect the certain items of information. Thus, the one or more computer systems may preserve processing resources by not making unnecessary changes to respective user accounts.

As shown in FIG. 2, the central tokenization system 202 may further be used for query requests 224 and validation requests 226, which may be received by the central tokenization system 202 from other computer systems. The other computer systems may include the partner systems 210-212 and third-party systems 214-216 or may include computer systems outside of the system 200 that are able to access the central tokenization system 202 to perform query requests 224 and validation requests 226. For example, outside computer systems may correspond to merchants or service providers that do not listen for published updates 220 or are not subscribed to by the central tokenization system 202. In some embodiments, the outside computer systems may have access to the central tokenization system 202 via an application programming interface (API). In one example, the outside computer systems may access the central tokenization system 202 during transaction processing using tokenized data.

For example, at block 118 of FIG. 1B and continuing in reference to FIG. 2, the central tokenization system 202 may receive a query request 224 from a computer system (e.g., partner system, third-party system, or computer system outside of system 200). The query request 224 may include a token and a request for information from the central tokenization system 202 corresponding to a user account linked to the token.

As an illustration, the computer system that sends a query request 224 to the central tokenization system 202 may correspond to a merchant that is processing an electronic transaction conducted by the user 204 on the merchant's website or via a merchant application. The user 204 may have provided the merchant with a token for use in the electronic transaction. The merchant may send a query request 224 to the central tokenization system 202 to retrieve information that is necessary to complete the processing of the electronic transaction (e.g., mailing address, billing address, funding information, contact information, etc.).

In some embodiments, where a mailing address is used in the electronic transaction, the mailing address may be an on-the-go geocoordinate address that is stored in association with the main user account for the central tokenization system 202. The on-the-go geocoordinate address may be a periodically updated geocoordinate address (e.g., via polling the user device 206) that may also be confirmed by the user 204, so that when the user 204 uses a token in a payment transaction flow, the user 204 will know that the address for the token is a recently updated geocoordinate address tied to the user device 206. For example, the user 204 may be provided a prompt for the main user account that asks, "Do you want to use your current device geolocation as your mailing address?" A positive response from the user 204 will cause the address associated with the main user account to update to the current geocoordinates of the user device 206. Thus, the user 204 will not necessarily need to know their street address to receive a delivery from a merchant as a delivery service can drop off a package at the geocoordinates.

At block 120, the central tokenization system 202 may identify a user account corresponding to the token received in the query request 224. For example, the central tokenization system 202 may search for the user account by performing a reverse lookup in the user account database associated with the central tokenization system 202. At block 122, once the user account has been identified, the central tokenization system 202 may obtain the user information that was requested in the query request 224 and respond to the query request 224 by sending the obtained user information to the computer system that made the query request 224.

Thus, the computer systems that are capable of sending query requests 224 to the central tokenization system 202 may preserve data storage resources as they may only need to store a token for a user account and may simply relay query requests 224 to the central tokenization system 202 to fetch user information on an ad hoc basis.

In a validation use case, at block 124, the central tokenization system 202 may receive a validation request 226 associated with a token. For example, the validation request 226 may be for the purposes of validating that user information associated with the token is correct. As an illustration, a merchant may be processing an electronic transaction for which the user 204 has provided user information, such as a mailing address, and a token. The merchant may want to validate that the mailing address correctly corresponds to a user account corresponding to the token. For example, a merchant may rely on the validation request 226 process for regional/localized address validation to check for completeness (e.g., a merchant system can rely on central tokenization system's 202 expertise for a particular region/location to validate the correctness of an address).

Thus, at block 126, the central tokenization system 202 may identify the user account corresponding to the token received in the validation request 226. For example, the central tokenization system 202 may search for the user account in the user database associated with the central tokenization system 202 by performing a reverse lookup using the token to identify the user account. The central tokenization system 202 may determine whether the user information in the validation request 226 matches the user information corresponding to the identified user account linked to the token.

At block 128, the central tokenization system 202 may respond to the validation request 226 with a determination as to whether the user information in the validation request 226 matches the user information corresponding to the identified user account linked to the token. In some embodiments, where the user information in the validation request 226 matches the user information corresponding to the identified user account, the response to the validation request 226 may cause the requesting computer system to proceed with an action (e.g., continue processing an electronic transaction using the user-provided user information as it has been validated).

When the user information in the validation request 226 does not match the user information corresponding to the identified user account, the response to the validation request 226 may cause the requesting computer system to abstain from proceeding with the action or request additional/corrective information from the user 204 that would allow the action to continue. For example, the requesting computer system may ask the user to correct a mistake in the address or provide a different address. In some embodiments, the additional/corrective information from the user 204 may also be validated by sending another validation request 226 to the central tokenization system 202.

Figure 3:
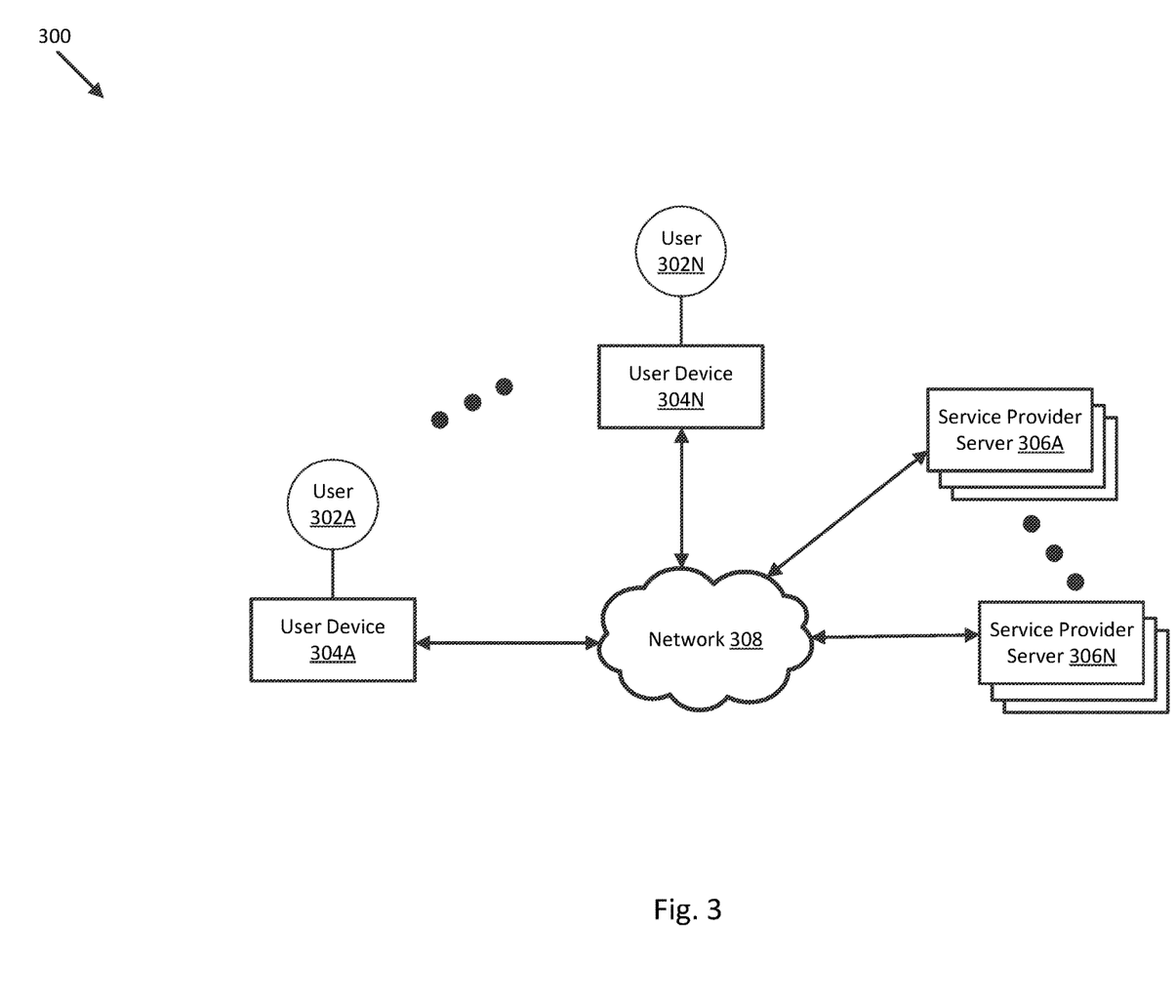
FIG. 3 illustrates a block diagram of a networked system suitable for implementing one or more embodiments of the present disclosure.

Referring now to FIG. 3, a block diagram of a networked system 300 configured to facilitate one or more processes in accordance with various embodiments of the present disclosure is illustrated. System 300 includes user devices 304A-304N and electronic service provider servers 306A-306N. A user 302A is associated with user device 304A, where user 302A can provide an input to service provider servers 306A-306N using user device 304A. Users 302A+1 through 302N may be associated with user devices 304A+1 through 304N, where users 302A+1 through 302N can provide an input to service provider servers 306A-306N using their respective user device.

User devices 304A-304N and service provider servers 306A-306N may each include one or more processors, memories, and other appropriate components for executing instructions such as program code and/or data stored on one or more computer-readable mediums to implement the various applications, data, and operations described herein. For example, such instructions may be stored in one or more computer-readable media such as memories or data storage devices internal and/or external to various components of system 300, and/or accessible over a network 308. Each of the memories may be non-transitory memory. Network 308 may be implemented as a single network or a combination of multiple networks. For example, in various embodiments, network 308 may include the Internet or one or more intranets, landline networks, and/or other appropriate types of networks.

User device 304A may be implemented using any appropriate hardware and software configured for wired and/or wireless communication over network 308. For example, in some embodiments, user device 304A may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 304A may include one or more browser applications which may be used, for example, to provide a convenient interface to facilitate responding to requests over network 308. For example, in one embodiment, the browser application may be implemented as a web browser configured to view information available over the internet and respond to requests sent by service provider servers 306A-306N. User device 304A may also include one or more toolbar applications which may be used, for example, to provide client-side processing for performing desired tasks in response to operations selected by user 302A. In one embodiment, the toolbar application may display a user interface in connection with the browser application.

User device 304A may further include other applications as may be desired in particular embodiments to provide desired features to user device 304A. For example, the other applications may include an application to interface between service provider servers 306A-306N and the network 308, security applications for implementing client-side security features, programming client applications for interfacing with appropriate application programming interfaces (APIs) over network 308, or other types of applications. In some cases, the APIs may correspond to service provider servers 306A-306N. The applications may also include email, texting, voice, and instant messaging applications that allow user 302A to send and receive emails, calls, and texts through network 308, as well as applications that enable the user 302A to communicate to service provider servers 306A-306N. User device 304A includes one or more device identifiers which may be implemented, for example, as operating system registry entries, cookies associated with the browser application, identifiers associated with hardware of user device 304A, or other appropriate identifiers, such as those used for user, payment, device, location, and or time authentication. In some embodiments, a device identifier may be used by service provider servers 306A-306N to associate user 302A with a particular account maintained by the service provider servers 306A-306N. A communications application with associated interfaces facilitates communication between user device 304A and other components within system 300. User devices 304A+1 through 304N may be similar to user device 304A.

Service provider servers 306A-306N may be maintained, for example, by corresponding online service providers, which may provide electronic transaction services in some cases. In this regard, service provider servers 306A-306N may include one or more applications which may be configured to interact with user devices 304A-304N over network 308 to facilitate the electronic transaction services. Service provider servers 306A-306N may maintain a plurality of user accounts (e.g., stored in a user account database accessible by service provider servers 306A-306N), each of which may include account information associated with individual users, and some of which may have linked tokens as discussed herein. Service provider servers 306A-306N may perform various functions, including communicating over network 308 with each other, and in some embodiments, a payment network and/or other network servers capable a transferring funds between financial institutions and other third-party providers to complete transaction requests and process transactions.

Figure 4:
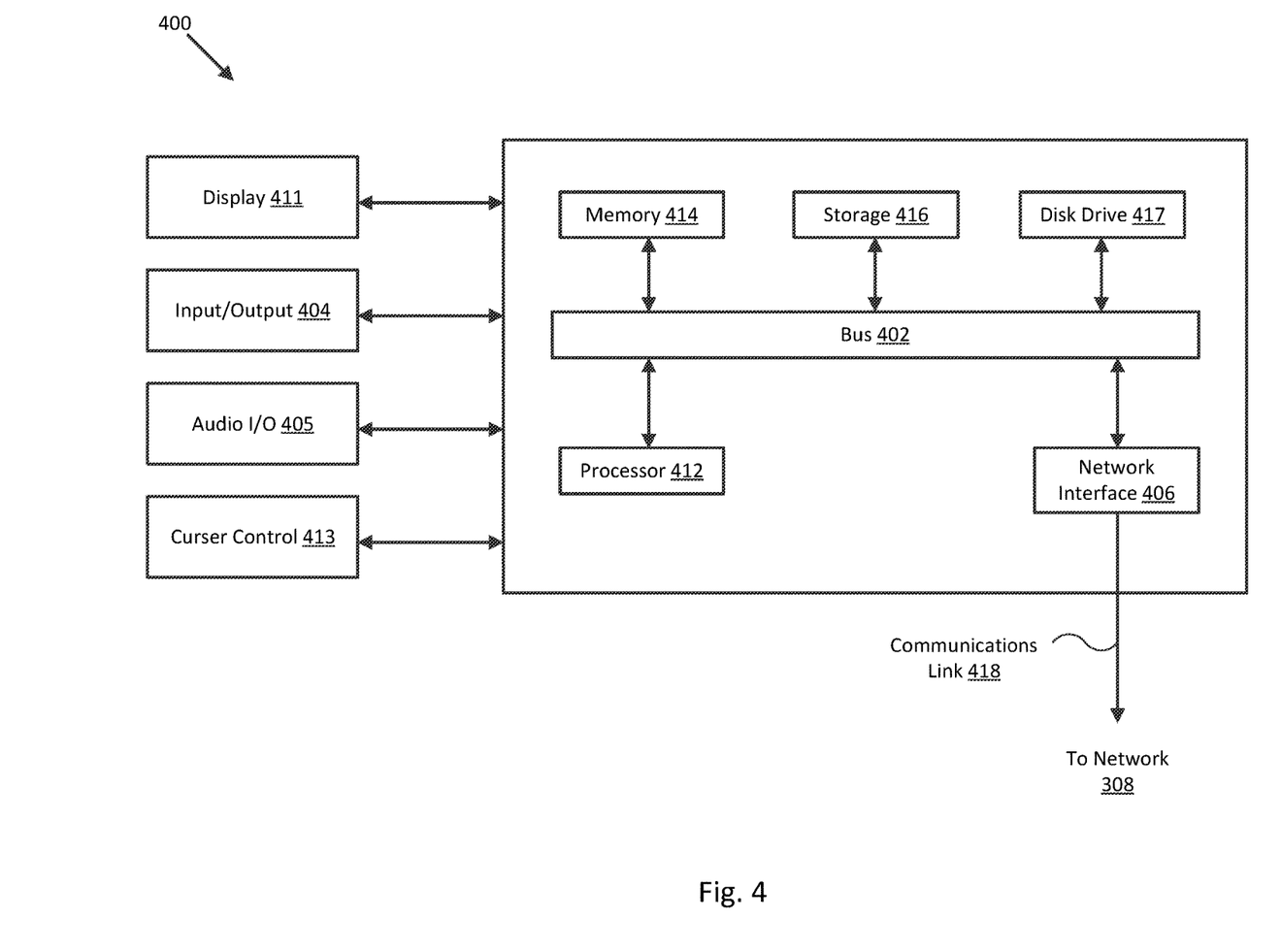
FIG. 4 illustrates a block diagram of a computer system in accordance with one or more embodiments of the present disclosure.

FIG. 4 illustrates a block diagram of a computer system 400 suitable for implementing one or more embodiments of the present disclosure. It should be appreciated that each of the devices utilized by users, entities, and service providers (e.g., computer systems) discussed herein may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). I/O component 404 may further include NFC communication capabilities. An optional audio I/O component 405 may also be included to allow a user to use voice for inputting information by converting audio signals. Audio I/O component 405 may allow the user to hear audio. A transceiver or network interface 406 transmits and receives signals between computer system 400 and other devices, such as another user device, an entity server, and/or a provider server via network 308. In one embodiment, the transmission is wireless, although other transmission mediums and methods may also be suitable. Processor 412, which may be one or more hardware processors, can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer-readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network 308 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A first computer system, comprising:
a non-transitory memory storing instructions; and
one or more hardware processors configured to execute the instructions and cause the first computer system to perform operations comprising:
receiving a notification from a second computer system that user information has changed for a first user account serviced by the second computer system, wherein the notification includes a token corresponding to a second user account serviced by the first computer system, and wherein the first user account and the second user account belong to a user;
searching for the second user account by using the token for a lookup in a database associated with the first computer system;
validating, based on one or more predefined format rules specified by a jurisdiction associated with the second user account, that the changed user information is in an acceptable format for the jurisdiction;
determining whether a current geolocation of the user matches a physical address specified by the changed user information, wherein the physical address comprises a residential address, a billing address, or a mailing address;
updating, based on the validating and the determining indicating the current geolocation of the user matches the physical address specified by the changed user information, the second user account to include the changed user information; and
publishing, in response to updating the second user account to include the changed user information, the changed user information to one or more other computer systems that subscribe to updates from the first computer system, wherein the published changed user information causes the one or more other computer systems to update corresponding user accounts to include the changed published user information.

2. The first computer system of claim 1, wherein the first computer system comprises a central tokenization system, and wherein the second computer system comprises a third-party computer system that is connected to the central tokenization system.

3. The first computer system of claim 1, wherein the operations further comprise:
generating a token for the second user account serviced by the first computer system; and
sending the token to the second computer system, wherein the receiving the token causes the second computer system to link the token to the first user account serviced by the second computer system.

4. The first computer system of claim 3, wherein the token is provided in the publishing the user information change to the one or more other computer systems, and wherein the token further causes the one or more other computer systems to update the corresponding user accounts to include the changed user information, wherein the corresponding user accounts have been linked to the token.

5. The first computer system of claim 1, wherein the second computer system is in a first group of computer systems to which the first computer system is subscribed, and wherein the one or more other computer systems are in a second group of computer systems to which the first computer system publishes user information.

6. The first computer system of claim 5, wherein the first group comprises partner computer systems and the second group comprises third-party computer systems.

7. The first computer system of claim 1, wherein the user information comprises a virtual address for the user.

8. The system of claim 1, wherein the current geolocation of the user is periodically updated based on periodically polled information received from a device of the user.

9. A method, comprising:
receiving, by a computer system, a request from a user device to change user information associated with a token;
identifying, by the computer system, a user account that corresponds to the token;
validating, by the computer system, that the user information to be changed is in an acceptable format based on one or more predefined format rules for the user information, wherein the acceptable format is defined by the one or more predefined format rules based on a jurisdiction in which the user account is located, and wherein the validating is further based on a match between geolocation data received from the user device and a physical address specified by the user information to be changed, wherein the physical address comprises a residential address, a billing address, or a mailing address;
changing, by the computer system based on a result of the validating indicating that the geolocation data received from the user device matches the physical address specified by the user information to be changed, the user information for the user account; and
publishing, by the computer system in response to changing the user information for the user account, the changed user information to one or more other computer systems that subscribe to updates from the computer system, wherein the published changed user information causes the one or more other computer systems to update respective user accounts corresponding to the token to include the changed user information.

10. The method of claim 9, further comprising:
authenticating, by the computer system, a user of the user device.

11. The method of claim 10, wherein the changed user information comprises a change to the physical address for the user account, and wherein the predefined format rules for the user information are specific to a region encompassing a new physical address in the changed physical address.

12. The method of claim 9, further comprising:
receiving, by the computer system, a query for the user information from a merchant computer system, wherein the query includes the token;
identifying, by the computer system, the user account that corresponds to the token; and
sending, by the computer system to the merchant computer system, a response containing the changed user information, wherein the changed user information allows a checkout process by the merchant computer system to continue to completion.

13. The method of claim 9, further comprising:
receiving, by the computer system from a merchant computer system, a validation request that includes the changed user information and the token;
accessing, by the computer system and based on the token, a database that stores user data that maps to a plurality of tokens including the token;
verifying, by the computer system, that the changed user information received in the validation request maps to the token in the database; and
sending, by the computer system to the merchant computer system, a response to the validation request indicating that the changed user information is valid.

14. The method of claim 9, wherein the user information comprises a virtual address for the user account.

15. The method of claim 9, further comprising periodically updating the geolocation data received from the user device based on a periodic polling of the user device.

16. A non-transitory machine-readable medium having instructions stored thereon, wherein the instructions are executable to cause a machine of a first computer system to perform operations comprising:
receiving, from a second computer system, a redirection of a user device to a user interface provided by the first computer system for changing user information for a user the redirection includes a token;
receiving, through the user interface, a request to change user information for the user account;
performing a lookup in a database using the token;
identifying, based on the lookup, the user account in the database;
determining, based on one or more rules specified by a jurisdiction associated with the user account, that changing the user information will comply with the one or more rules;
comparing a geolocation of the user device with a user account physical address associated with the user information after the changing, wherein the physical address comprises a residential address, a billing address, or a mailing address;
changing, based on the determining and based on a result of the comparing indicating that the geolocation of the user device is within a threshold distance of the user account physical address associated with the user information after the changing, the user information based on the request;
updating the user account to include the changed user information; and
publishing, based on the updating, the changed user information to one or more computer systems that subscribe to updates from the first computer system, wherein the published changed user information causes the one or more computer systems to update corresponding user accounts to include the changed user information.

17. The non-transitory machine-readable medium of claim 16, wherein the request is for a change to the user account physical address, and wherein the operations further comprise validating that the change to the user account physical address is in a correct format.

18. The non-transitory machine-readable medium of claim 16, wherein the operations further comprise:
sending a security challenge to the user device to be presented in the user interface; and
authenticating the user device based on receiving a correct response to the security challenge.

19. The non-transitory machine-readable medium of claim 16, wherein the second computer system is included in the one or more computer systems that subscribe to updates from the first computer system and receive the published changed user information.

\* \* \* \* \*

UNITED STATES PATENT AND TRADEMARK OFFICE
CERTIFICATE OF CORRECTION

| | | |
|---|---|---|
| PATENT NO. | : 12,287,855 B2 | Page 1 of 1 |
| APPLICATION NO. | : 17/548230 | |
| DATED | : April 29, 2025 | |
| INVENTOR(S) | : Narendra Singh | |

It is certified that error appears in the above-identified patent and that said Letters Patent is hereby corrected as shown below:

In the Claims

Claim 16, Column 15, Lines 25-26, change "for a user the redirection" to --for a user account, wherein the redirection--.

Signed and Sealed this
Fifteenth Day of July, 2025

Coke Morgan Stewart
*Acting Director of the United States Patent and Trademark Office*